United States Patent
Wu

(10) Patent No.: US 10,195,981 B1
(45) Date of Patent: Feb. 5, 2019

(54) HEADLIGHT

(71) Applicant: COPLUS INC., New Taipei (TW)

(72) Inventor: Jacob Wu, Tainan (TW)

(73) Assignee: COPLUS INC., New Taipei (TW)

( * ) Notice: Subject to any disclaimer, the term of this patent is extended or adjusted under 35 U.S.C. 154(b) by 0 days.

(21) Appl. No.: 15/868,096

(22) Filed: Jan. 11, 2018

(30) Foreign Application Priority Data

Aug. 7, 2017 (TW) .............................. 106126564 A

(51) Int. Cl.
| | |
|---|---|
| *B60Q 1/068* | (2006.01) |
| *F21S 41/20* | (2018.01) |
| *F21S 41/30* | (2018.01) |
| *B60Q 1/076* | (2006.01) |
| *F21S 41/19* | (2018.01) |
| *F21S 45/48* | (2018.01) |

(52) U.S. Cl.
CPC ........... *B60Q 1/0683* (2013.01); *B60Q 1/076* (2013.01); *F21S 41/192* (2018.01); *F21S 41/28* (2018.01); *F21S 41/285* (2018.01); *F21S 41/30* (2018.01); *F21S 45/48* (2018.01)

(58) Field of Classification Search
CPC ....... B60Q 1/0683; B60Q 1/076; F21S 45/48; F21S 41/28; F21S 41/192; F21S 41/30; F21S 41/285
See application file for complete search history.

(56) References Cited

U.S. PATENT DOCUMENTS

| | | | | |
|---|---|---|---|---|
| 4,794,495 A | * | 12/1988 | McMahan ............ | B60Q 1/0683 33/613 |
| 5,499,173 A | * | 3/1996 | Yamamoto .............. | F21S 45/33 362/460 |
| 6,227,690 B1 | * | 5/2001 | Matsubara ........... | B60Q 1/0683 362/284 |
| 2008/0080202 A1 | * | 4/2008 | Apfelbeck ............. | B60Q 1/076 362/526 |

* cited by examiner

*Primary Examiner* — David V Bruce
(74) *Attorney, Agent, or Firm* — DLA Piper LLP (US)

(57) ABSTRACT

A headlight includes a shell unit defining a mounting space that extends in a front-rear direction, a mounting seat pivotally mounted in the mounting space, and having a plurality of mounting portions, a plurality of light emitting units respectively mounted to the mounting portions of the mounting seat, and an adjusting unit including an adjusting member that is mounted to the mounting seat, and that is operable for adjusting the angular position of the mounting seat. Each of the light emitting units includes a light emitting member, and a lens disposed in front of the light emitting member for allowing a light beam emitted from the light emitting member to pass therethrough.

13 Claims, 5 Drawing Sheets

US 10,195,981 B1

HEADLIGHT

CROSS-REFERENCE TO RELATED APPLICATION

This application claims priority of Taiwanese Patent Application No. 106126564, filed on Aug. 7, 2017.

FIELD

The disclosure relates to a headlight, and more particularly to a headlight that can be configured as a high beam, a low beam, or a turn signal of a vehicle.

BACKGROUND

A conventional headlight is adapted for use in a vehicle, and includes a shell, and a plurality of light emitting modules disposed in the shell. Each of the light emitting modules can independently emit a light beam. The light emitting modules cooperatively form a high beam or a low beam. The orientation of each of the light emitting modules may be required to be adjusted for emitting the light beam at an output angle that is satisfied with the regulations. However, since the light emitting modules are separately mounted in the shell, when a user needs to adjust light output angles of the light beams emitted from the light emitting modules, he or she has to adjust the light emitting modules one by one. In such a manner, the user requires to repeat such an orientation adjustment for many times, thus resulting in a time-consuming adjusting operation. In addition, since the orientations of the light emitting modules are individually adjusted, when the user adjusts the orientation of one of the light emitting modules, the orientation of an adjacent one of the light emitting modules which has been adjusted may be required to be re-adjusted. As a result, the adjusting operation becomes quite complicated.

SUMMARY

Therefore, the object of the disclosure is to provide a headlight that light output angles of light beams emitted therefrom can be conveniently and rapidly adjusted.

According to the disclosure, the headlight includes a shell unit defining a mounting space that extends in a front-rear direction, a mounting seat pivotally mounted in the mounting space, and having a plurality of mounting portions, a plurality of light emitting units respectively mounted to the mounting portions of the mounting seat, and an adjusting unit including an adjusting member that is mounted to the mounting seat, and that is operable for adjusting the angular position of the mounting seat. Each of the light emitting units includes a light emitting member, and a lens disposed in front of the light emitting member for allowing a light beam emitted from the light emitting member to pass therethrough.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
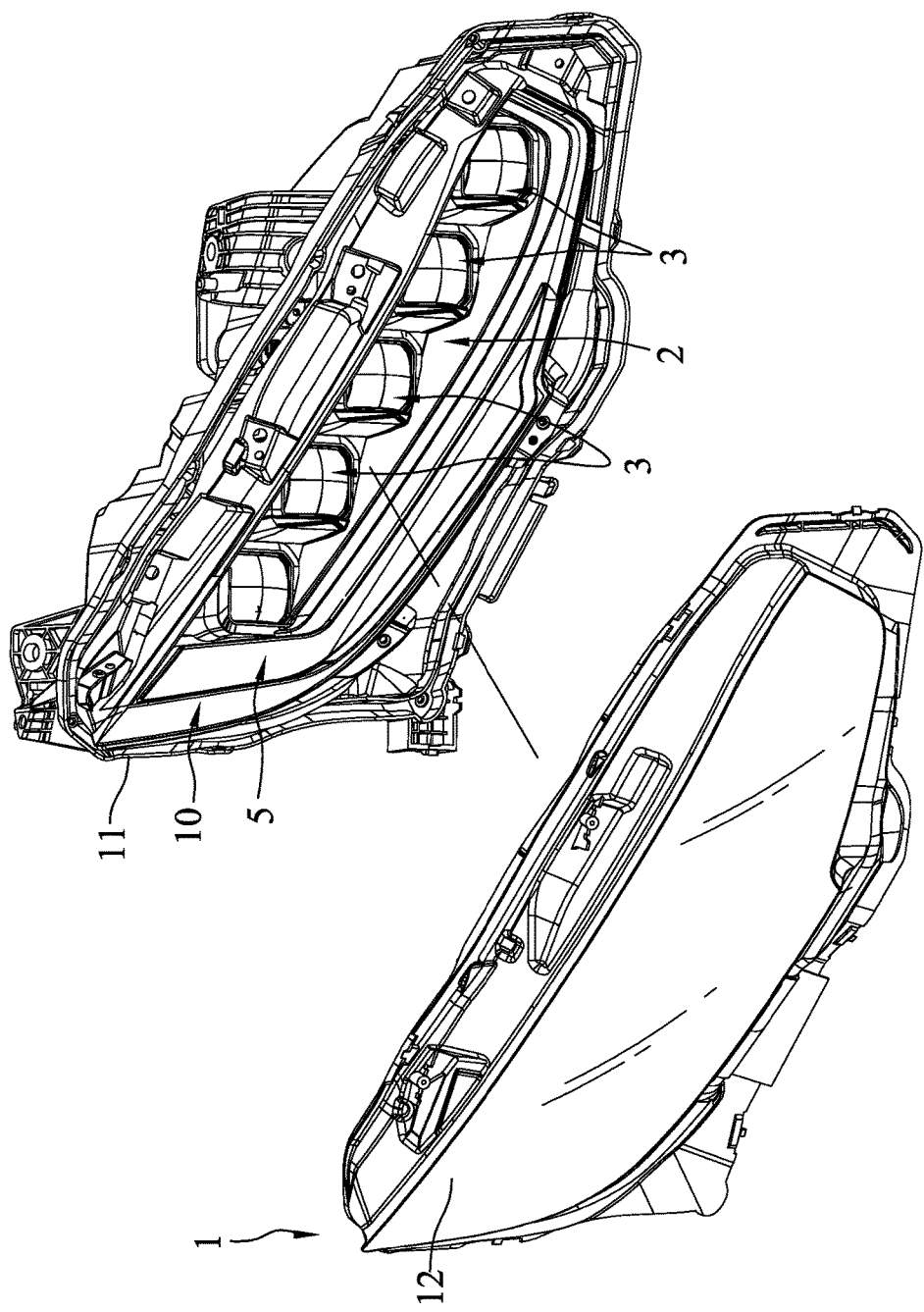
FIG. 1 is a partial exploded perspective view illustrating a first embodiment of a headlight according to the disclosure.
Figure 2:
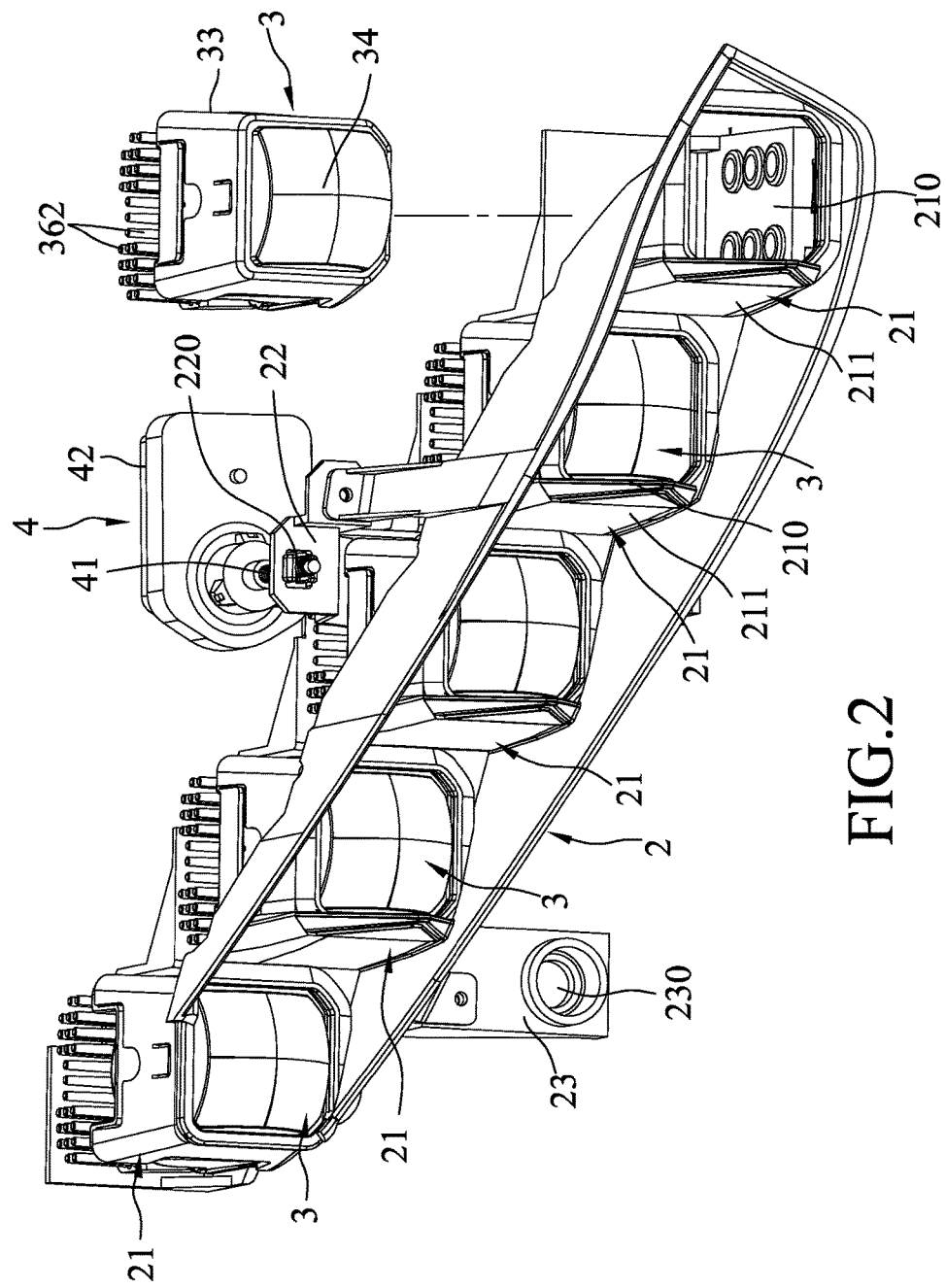
FIG. 2 is a partially exploded perspective view of a mounting seat and a plurality of light emitting units of the first embodiment.
Figure 3:
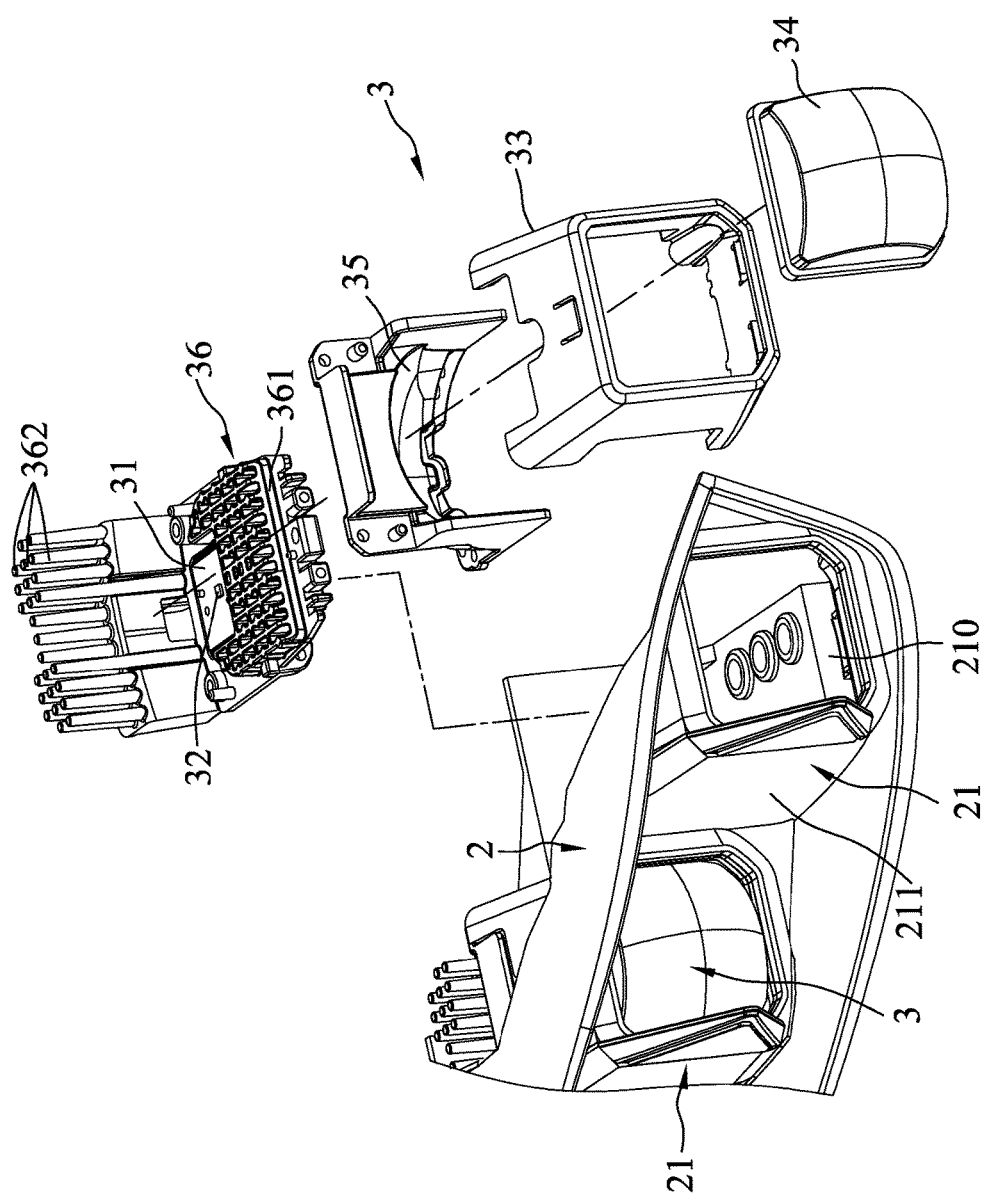
FIG. 3 is a fragmentary and partially exploded perspective view of the light emitting units and the mounting seat of the first embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, the first embodiment of a headlight according to the disclosure is adapted for use in transportation such as a vehicle, and includes a shell unit 1, a mounting seat 2, a plurality of light emitting units 3, an adjusting unit 4 and an ancillary light unit 5.

The shell unit 1 includes a shell 11 and a transparent light output cover 12 cooperatively defining a mounting space 10 that extends in a front-rear direction. The light output cover 12 is disposed in front of the shell 11.

The mounting seat 2 is pivotally mounted in the mounting space 10, and has a plurality of mounting portions 21 arranged in a left-right direction, an adjusting portion 22, and a coupling portion 23 pivotally coupled with the shell 11 of the shell unit 1. The mounting portions 21, the adjusting portion 22 and the coupling portion 23 are arranged in a top-bottom direction. In this embodiment, the adjusting portion 22 is disposed above the mounting portions 21, and the coupling portion 23 is disposed below the mounting portions 21. Each of the mounting portions 21 has a surrounding wall 211, and a mounting hole 210 surrounded by the surrounding wall 211, and extending in the front-rear direction. The adjusting portion 22 is formed with an adjusting hole 220 configured as a threaded hole. The coupling portion 23 is formed with a coupling hole 230. A pivot rod (not shown) extends through the coupling hole 230 to pivotally couple the coupling portion 23 of the mounting seat 2 with the shell 11 of the shell unit 1. It should be noted that, when the coupling portion 23 is pivotally coupled with the shell 11, the coupling portion 23 is slightly rotatable relative to the shell 11.

The light emitting units 3 are respectively mounted to the mounting portions 21 of the mounting seat 2. Each of the light emitting units 3 is received in the mounting hole 210 of a corresponding one of the mounting portions 21, and is surrounded by the surrounding wall 211 of the corresponding one of the mounting portions 21. Each of the light emitting units 3 includes a circuit board 31, a light emitting member 32 electrically connected to the circuit board 31, a receiving frame 33 surrounded by the surrounding wall 211 of the corresponding one of the mounting portions 21, a lens 34 disposed in front of the light emitting member 32 for allowing a light beam which is emitted from the light emitting member 32 to pass therethrough, a reflecting cover 35 disposed for reflecting the light beam which is emitted from the light emitting member 32 toward the lens 34, and a heat dissipating member 36. For each of the light emitting units 3, since the reflecting cover 35 covers a top side and a rear side of the light emitting member 32, the light beam emitted from the light emitting member 32 is reflected forwardly so as to allow the light beam to pass through the lens 34 and to be output from the light output cover 12. The lens 34 and the reflecting cover 35 are respectively disposed at a front side and a rear side of the receiving frame 33. The dissipating member 36 has a base portion 361 extending into and fixedly connected to the receiving frame 33, and a plurality of heat dissipating fins 362 disposed behind the base portion 361. The circuit board 31 is mounted onto a top surface of the base portion 361.

It should be noted that, in this embodiment, the number of the light emitting units 3 is five, and the number of the mounting portions 21 is also five. In other embodiments, the numbers of the light emitting units 3 and the mounting portions 21 may be varied.

Figure 4:
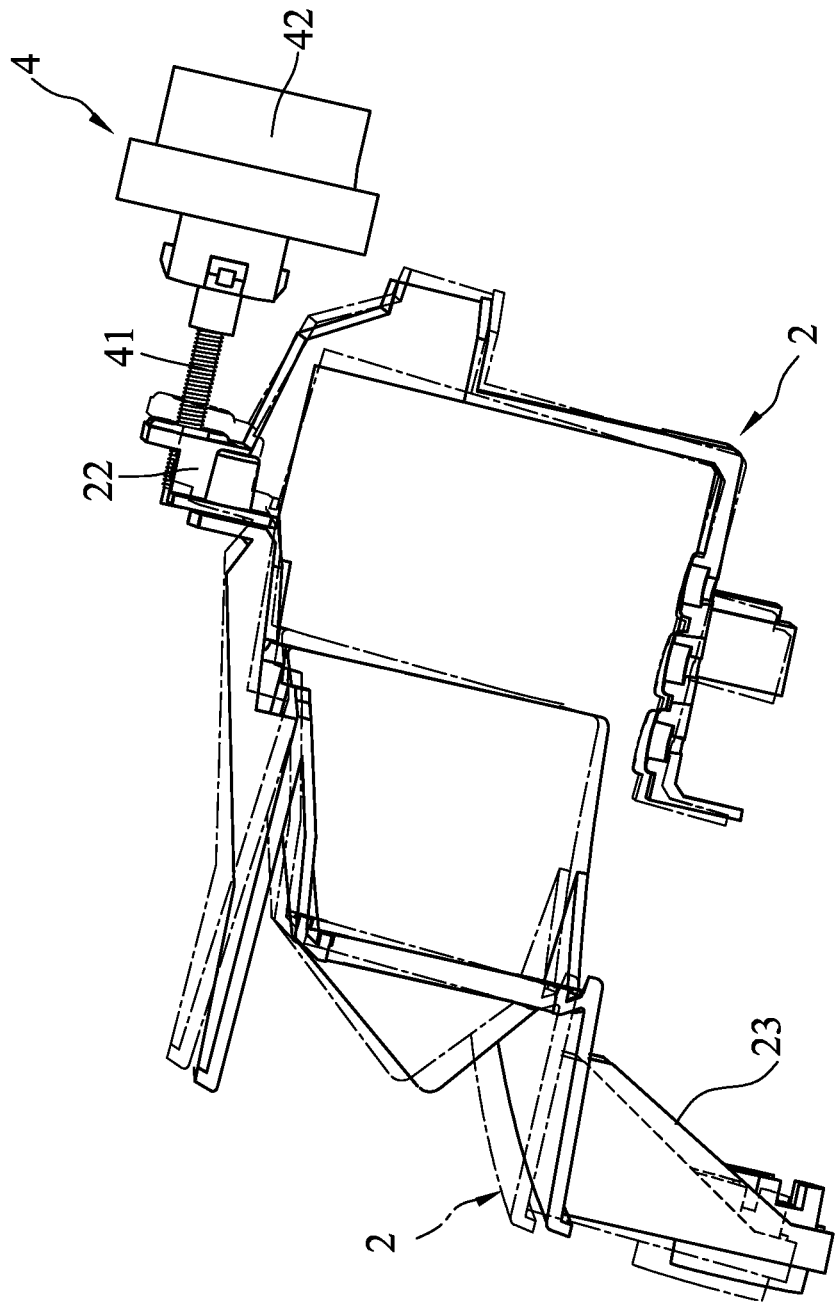
FIG. 4 is a side schematic view of the first embodiment, illustrating the angular displacement of the mounting seat.

The adjusting unit 4 includes an adjusting member 41 mounted to the mounting seat 2, and is operable for adjusting the angular position of the mounting seat 2, and a motor 42 electrically connected to the adjusting member 41, and driving rotation of the adjusting member 41. In this embodiment, the adjusting member 41 is a screw threadedly extending through the adjusting hole 220 of the adjusting portion 22. The adjusting member 41 is drivably rotatable for driving rotation of the mounting seat 2 so as to change the angular position of the mounting seat 2 (An imaginary line in FIG. 4 illustrates the angular position of the mounting seat 2 that has been changed). In addition, since the light emitting units 3 are mounted to the mounting seat 2, when the angular position of the mounting seat 2 is changed, light output angles of light beams emitted from the light emitting units 3 are also adjusted.

The ancillary light unit 5 is mounted in the mounting space 10, and is disposed at one side of the light emitting members 3. The ancillary light unit 5 may be configured as a daytime running light (DRL), a turn signal, or an indicating light which can increase functions of the disclosure.

When assembling the headlight, each of the light emitting units 3 is first assembled as a module, and is mounted to the corresponding one of the mounting portions 21 of the mounting seat 2. Next, each of the light emitting units 3 is mounted to the corresponding one of the mounting portions 21 from a rear side of the mounting hole 210, and is fixed to the surrounding wall 211 with a screw or an engaging manner. After the light emitting units 3 are mounted to the mounting seat 2, the motor 42 drives the rotation of the adjusting member 41. Since the adjusting member 41 threadedly extends through the adjusting hole 220, the rotation of the adjusting member 41 drives the mounting seat 2 to slightly rotate so as to change the angular position of the mounting seat 2, and so as to change the light output angles of the light beams emitted from the light emitting units 3.

In use, the light emitting units 3 cooperatively form a light with a certain function. For example, the light emitting units 3 can cooperatively form a high beam, or can cooperatively form a low beam, or can cooperatively form a light having both high beam and low beam functions. One part of the light emitting units that has both high beam and low beam function cooperatively form the high beam, and the other part of the light emitting units 3 cooperatively form the low beam. When two headlights are respectively disposed at left and right sides of the vehicle, for each of the headlights, two of the light emitting units 3 which are close to a central portion of the vehicle cooperatively form the high beam, and the remaining three of the light emitting units 3 which are distal from the central portion of the vehicle cooperatively form the low beam. With such disposition, the shape of the light projected area, the brightness of the light beams emitted from the light emitting units 3, and the light projecting angle of the light beams emitted from the light emitting units 3 are satisfied with the regulations.

It should be noted that, in this embodiment, the adjusting member 41 is electrically driven by the motor 42, and the motor 42 may be omitted in other embodiments, in which a user may manually rotate the adjusting member 41 to adjust the light output angles of the light beams.

In conclusion, with the disposition of the mounting seat 2 and with the cooperation between the mounting seat 2 and the light emitting units 3, it is convenient and time-saving for the user to assemble the light emitting units 3 to the mounting seat 2, and it is also convenient and time-saving for the user to adjust the light output angles of the light beams emitted from the light emitting unit 3 by adjusting the angular position of the mounting seat 2.

Figure 5:
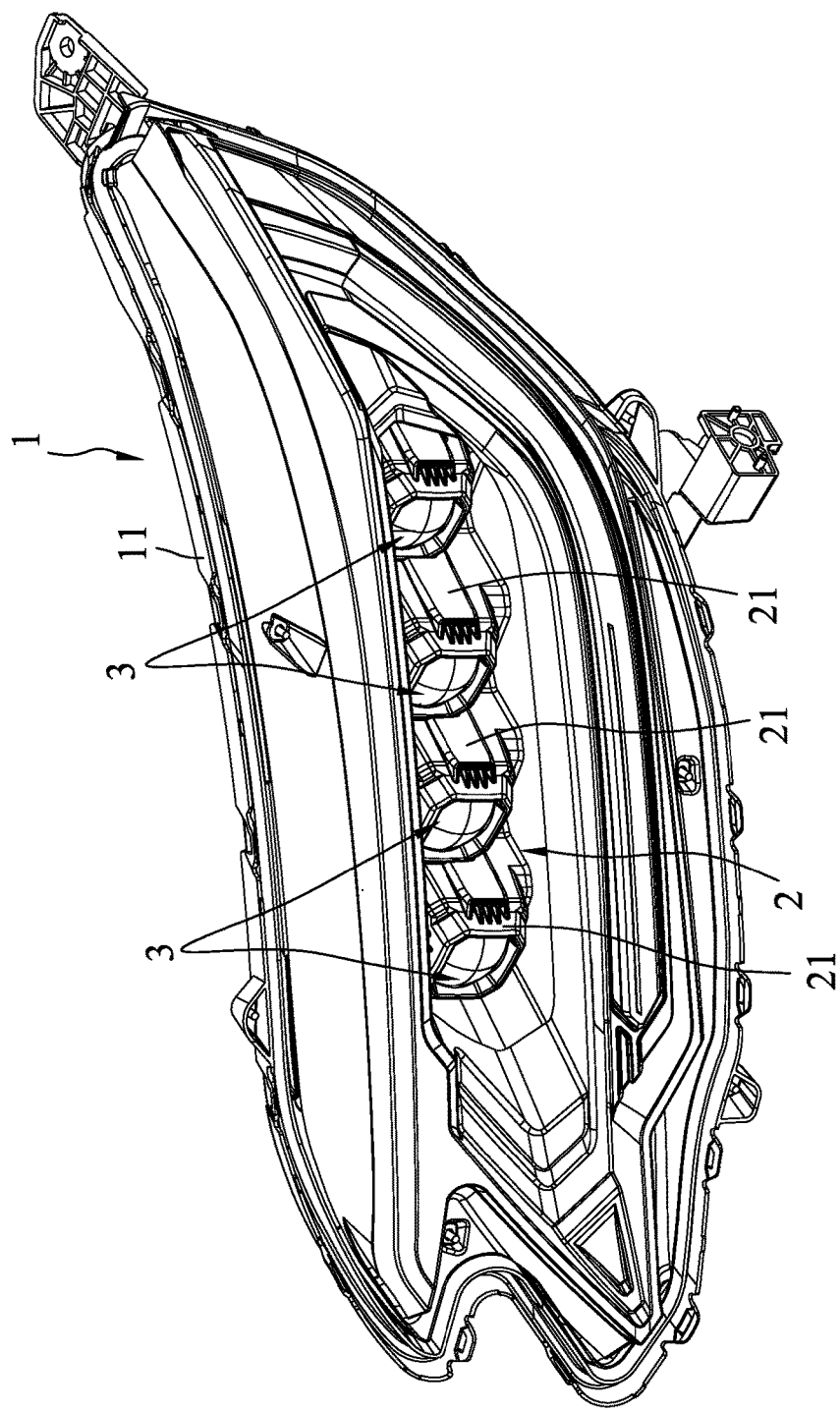
FIG. 5 is a fragmentary perspective view illustrating a second embodiment of the headlight according to the disclosure.

As shown in FIG. 5, the second embodiment has a structure similar to that of the first embodiment. The main difference between this embodiment and the previous embodiment resides in the number of the light emitting units 3. In this embodiment, the headlight includes four light emitting units 3, two of the light emitting units 3 which are close to the central portion of the vehicle cooperatively form the high beam, and the remaining two of the light emitting units 3 which are distal from the central portion of the vehicle cooperatively form the low beam. Therefore, the second embodiment has the same advantages as those of the first embodiment.

It should be noted that, the headlight may include three light emitting units 3 in other embodiments, two of the light emitting units 3 which are close to the central portion of the vehicle cooperatively forming the high beam, and the remaining one of the light emitting units 3 which is distal from the central portion of the vehicle forming the low beam.

In the description above, for the purposes of explanation, numerous specific details have been set forth in order to provide a thorough understanding of the embodiments. It will be apparent, however, to one skilled in the art, that one or more other embodiments may be practiced without some of these specific details.

It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A headlight comprising:
   a shell unit defining a mounting space that extends in a front-rear direction;
   a mounting seat pivotally mounted in said mounting space, and having a plurality of mounting portions;

a plurality of light emitting units respectively mounted to said mounting portions of said mounting seat, each of said light emitting units including a light emitting member, and a lens that is disposed in front of said light emitting member for allowing a light beam emitted from said light emitting member to pass therethrough; and an adjusting unit including an adjusting member that is mounted to said mounting seat, and that is operable for adjusting the angular position of said mounting seat;

wherein each of said light emitting units further includes a circuit board electrically connected to said light emitting member, and a reflecting cover disposed for reflecting the light beam emitted from said light emitting member toward said lens.

2. The headlight as claimed in claim 1, wherein:
said mounting seat further has a coupling portion pivotally coupled with said shell unit, and an adjusting hole disposed for allowing said adjusting member to threadedly extend therethrough; and said adjusting member is a screw, and is drivably rotatable for driving rotation of said mounting seat so as to change the angular position of said mounting seat.

3. The headlight as claimed in claim 2, wherein said adjusting unit further includes a motor disposed for driving rotation of said adjusting member.

4. The headlight as claimed in claim 1, wherein each of said light emitting units further includes a heat dissipating member having a plurality of heat dissipating fins.

5. The headlight as claimed in claim 1, wherein:
each of said mounting portions of said mounting seat has a surrounding wall, and a mounting hole surrounded by said surrounding wall, and extending in the front-rear direction; and each of said light emitting units is received in a corresponding one of said mounting holes of said mounting portions.

6. The headlight as claimed in claim 1 further comprising an ancillary light unit mounted in said mounting space.

7. The headlight as claimed in claim 1, wherein:
said shell unit includes a shell, and a transparent light output cover disposed in front of said shell; and said light output cover and said shell cooperatively define said mounting space.

8. A headlight comprising:
a shell unit defining a mounting space that extends in a front-rear direction;

a mounting seat pivotally mounted in said mounting space, and having a plurality of mounting portions;

a plurality of light emitting units respectively mounted to said mounting portions of said mounting seat, each of said light emitting units including a light emitting member, and a lens that is disposed in front of said light emitting member for allowing a light beam emitted from said light emitting member to pass therethrough;

an adjusting unit including an adjusting member that is mounted to said mounting seat, and that is operable for adjusting the angular position of said mounting seat; and an ancillary light unit mounted in said mounting space.

9. The headlight as claimed in claim 8, wherein:
said mounting seat further has a coupling portion pivotally coupled with said shell unit, and an adjusting hole disposed for allowing said adjusting member to threadedly extend therethrough; and said adjusting member is a screw, and is drivably rotatable for driving rotation of said mounting seat so as to change the angular position of said mounting seat.

10. The headlight as claimed in claim 9, wherein said adjusting unit further includes a motor disposed for driving rotation of said adjusting member.

11. The headlight as claimed in claim 8, wherein each of said light emitting units further includes a heat dissipating member having a plurality of heat dissipating fins.

12. The headlight as claimed in claim 8, wherein:
each of said mounting portions of said mounting seat has a surrounding wall, and a mounting hole surrounded by said surrounding wall, and extending in the front-rear direction; and each of said light emitting units is received in a corresponding one of said mounting holes of said mounting portions.

13. The headlight as claimed in claim 8, wherein:
said shell unit includes a shell, and a transparent light output cover disposed in front of said shell; and said light output cover and said shell cooperatively define said mounting space.

\* \* \* \* \*